United States Patent [19]

Stakhno

[11] 3,784,880
[45] Jan. 8, 1974

[54] APPARATUS FOR EFFECTING PULSE-WISE CONTROL OVER A DIRECT CURRENT MOTOR

[76] Inventor: Vladimir Ivanovich Stakhno, Dnepropetrovsk, U.S.S.R.

[22] Filed: Aug. 2, 1971

[21] Appl. No.: 168,127

[52] U.S. Cl. .............................. 318/138, 321/45 C
[51] Int. Cl. ............................................ H02k 29/00
[58] Field of Search ................. 321/45 C; 318/138, 318/254

[56] References Cited
UNITED STATES PATENTS

| | | | |
|---|---|---|---|
| 3,263,152 | 7/1966 | Walker | 321/45 C |
| 3,286,155 | 11/1966 | Corey | 321/45 C |
| 3,331,011 | 7/1967 | Landis | 321/45 C |
| 3,340,457 | 9/1967 | Schmitz | 321/45 C |
| R27,193 | 10/1971 | Risberg | 321/45 C |

Primary Examiner—Bernard A. Gilheany
Assistant Examiner—Thomas Langer
Attorney—Eric H. Waters et al.

[57] ABSTRACT

Systems for effecting control over direct-current electric drives, and, more particularly, to pulse-type control means included into the circuits of the armature windings of motors.

Apparatus for effecting pulse-wise control over a direct-current motor, consists in connecting the winding of the armature of the motor in parallel with two opposing rectifiers through limiting saturation chokes, thyristors and power diodes, the thyristors being electrically connected to each other through a two-windings transformer and capacitor means, the inputs of the recrifiers being connected to the secondary windings of the supply transformer.

4 Claims, 2 Drawing Figures

PATENTED JAN 8 1974　　　　　　　　　　　　　　　　　3,784,880

APPARATUS FOR EFFECTING PULSE-WISE CONTROL OVER A DIRECT CURRENT MOTOR

The present invention relates to systems for effecting control over-current electric drives, and, more particularly, it relates to pulse-type control means connected in the circuit of the winding of the armature of a motor.

Known in the art are control means which convert direct current voltage into a pulse sequence in such a way that the mean value of the voltage varies in magnitude and direction dependng on the pulse duration-to-pulse interval ratio of the control pulses fed to commutation elements. The commutation elements can be transistors or thyristors. The use of the thyristors allows a considerable increase in the power of the converters, but the required artificial quenching of the thyristors makes the circuit of these converters very complicated as compared to those using transistor circuits, particularly reversible converters.

There are known reversible pulse-type converter systems incorporating thyristors, such systems comprising not less than six thyristors and also capacitors, saturation chokes, pulse transformers, etc. As a result, the systems are fairly complicated which is reflected in their considerable cost and insufficient reliability of operation. The most complicated among such systems are those effecting the symmetric method of switching of the thyristors, although these systems are preferable from the point of view of the dynamic properties of the electric drive.

There is also known apparatus for effecting pulse-wise control over the voltage across the armature of a motor, which employs two-winding transformers that effect reduction of one of the thyristors into the non-conductive state thereof, when the other one of the thyristors is switched into the conductive state. (See the reports of the "Thyristor electric drives in engineering" Seminar, published by the Moscow Scientific and Engineering Propaganda House, article 1, page 84, FIG. 3, Moscow 1965).

The apparatus includes in the power circuit thereof six thyristors, two switching transformers and other components.

It is an object of the present invention to provide a pulse-type converter which will feature a relatively simple circuitry and and increased reliability of the performance, as a result of employing the same components as both power ones and switching ones.

The present invention resides in a novel circuit of an apparatus effecting pulse-wise control over the operation of a direct-current motor.

The objects of the present invention are attained in an apparatus for effecting control over a direct current electric motor, comprising two rectifiers shunted by capacitors and connected on the alternating-current side thereof to the respective ones of the two secondary windings of the supply transformers, said rectifiers being connected in parallel opposition, with the armature winding of said motor through limiting saturation chokes and power thyristors, in which apparatus, in accordance with the invention, said thyristors are magnetically connected with each other through a two-winding transformer and a pair of capacitors.

Each one of the windings of said two-winding transformer and the respective switching capacitor may make up a sequence connected either in parallel or in series with the respective thyristor.

An industrial specimen of the herein disclosed apparatus of a 800 W capacity has been successfully operating in the wire-making mill No 280 of the Tcherepovetz Metallurgical Plant. It has been found particularly advantageous from the electrical point of view to employ in the apparatus of the herein disclosed type high-frequency thyristors of the Standard "T4" Brand. The ratings of the specimen are, as follows: the frequency of the switching over of the thyristors — up to 500 Hz; load current — up to 4 A; load voltage — 220 V. The overall dimensions of the converter are (less supply transformer) 300 + 200 + 70 mm.

The present invention will be further described in connection with the followng detailed description of the embodiments thereof, with reference being had to the circuit diagrams appended.

It should be understood that other objects and advantages of the present invention, in addition to those described hereinabove, will become apparent from the following description and appended drawings, wherein.

Figure 1:
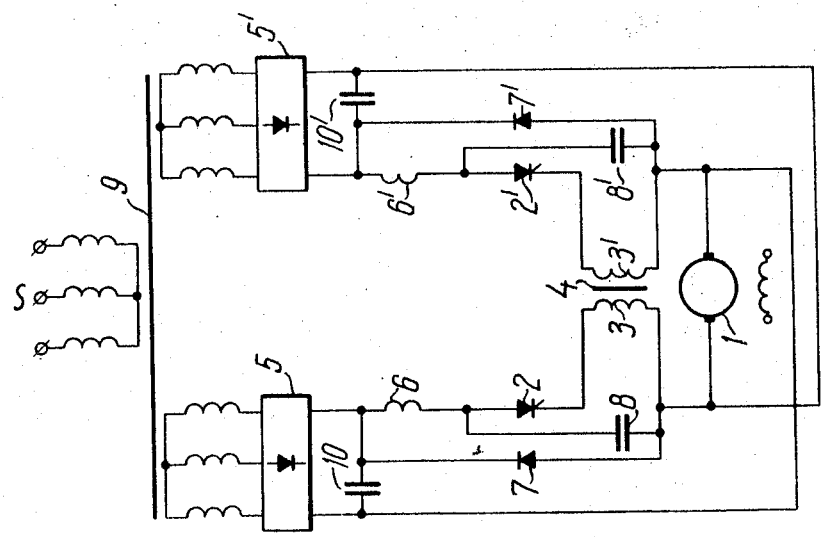
FIG. 1 is a circuit diagram of a preferred embodiment of the present invention.

One end or terminal of the winding of the armature of the motor 1 (FIG. 1) is connected to the cathode of a thyristor 2 through the winding 3 of a switching transformer 4. The anode of the thyristor 2 is connected to the output of a rectifier 5 through a saturation choke 6.

In parallel with the circuit made up by the choke 6, the thyristor 2 and the winding 3 of the transformer 4 there is connected a diode 7. In parallel with the thyristor 2 and the winding 3 of the transformer 4 there is connected a switching capacitor 8. The power supply of the rectifier 5 is effected from the secondary windings of a transformer 9, whereas the input of this rectifier is shunted by a capacitor 10.

The opposite end, or terminal of the windng of the armature of the motor 1 is connected to the transformer 9 by means of components similar to those described hereinabove, which are indicated in the appended drawings by like numerals with a prime C') symbol.

The apparatus operates, as follows. In the initial moment either one of the two thyristoes 2 or 2', is energized and conductive, while the other thyristor is deenergized. If it is the thyristor 2 that is conductive the output voltage of the rectifier 5 is supplied to the armature of the motor 1. The switching capacitor 8' is charged through the choke 6', the source 5, the choke 6, the thyristor 2, and the winding 3 of the transformer 4 of the source 5' to a voltage equal to the sum of the voltages of the rectifiers 5,5'. After a predetermined time interval the associated control circuit (not shown in the appended drawings) sends a control pulse to the thyristor 2'. With the thyristor 2' thus energized and made conductive the capacitor 8' is connected to the winding 3 of the transformer 4. Consequently, there is an electro-motive force created across the other winding 3' of the switching transformer 4, this EMF being applied through the capacitor 8 to the thyristor 2 in the non-conductive direction of the latter. The thyristor 2 is thus disconnected and the voltage of the source 5 is not applied to the load, while the thyristor 2' remains energized and the voltage of the source 5' is supplied to the armature of the motor 1. In this case the voltage polatity of the armature is reversed. The capacitor 8' is fully discharged, while the capacitor 8 is charged via the circuit comprising the source 5, the choke 6, the source 5', the choke 6', the thyristor 2', and the winding 3' of the transformer 4 to a voltage equal to the sum of the voltages of the sources 5, 5'. Should the thyristor 2 be energized and made conductive again the above-described process is repeated once more, i.e. the thyristor 2' becomes non-conductive, and the capacitor 8' is charged. Thus, the above circuit effects mutual description of the operation of the two thyristors by means of the capacitors 8, 8' and the switching transformer 4.

With the above circuit it is possible to control the ratio between the successive intervals of the conductive and non-conductive states of the thyristors 2 and 2' by varying the on-off time relationship of the control pulses, and thus to vary the means value of the voltage supplied to the motor armature as far as both the value and the polarity of this voltage are concerned, and, therefore, to provide a wide-pulse mode of the control of the motor, which is an obvious advantage of the abovedescribed circuit.

Figure 2:
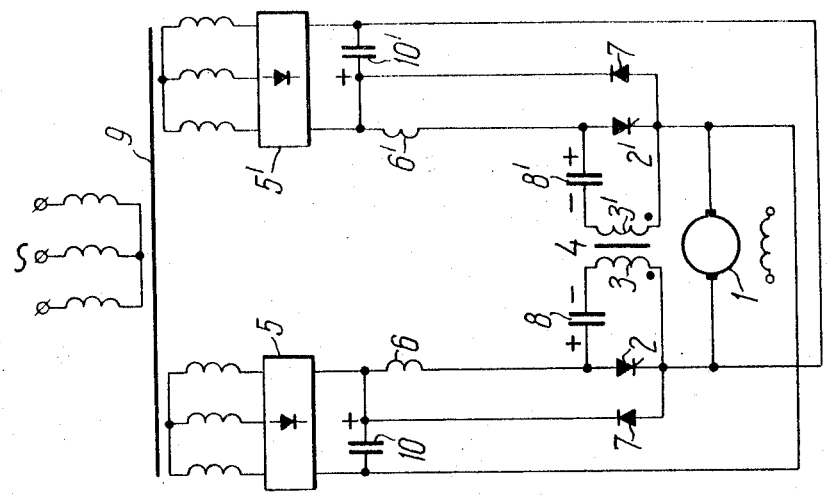
FIG. 2 illustrates an alternative embodiment of the invention.

The circuitry of the alternative embodiment of the present invention illustrated in FIG. 2 is different from the one described hereinabove in that here the windings 3 and 3' of the switching transformer 4 are connected with the respective thyristors in parallel and not in series. However, this difference does not introduce any essential changes into the operation of the herein disclosed apparatus.

The same apparatus can be successfully used for controlling a direct-current electric motor through the excitation winding thereof.

What is claimed is:

1. An apparatus for effecting pulse-wise control over a direct current motor through the armature winding thereof, comprising two rectifiers each having a positive terminal connected to an opposite side of said armature winding; a series circuit comprising limiting saturation choke means and power thyristors connected respectively between said positive rectifier terminals and said armature winding and connected directly to the negative terminals of the other rectifier; diodes in parallel and oppositely connectedto said series circuit; capacitors respectively connected in series with said choke means and in parallel with said power thyristors; and a two-winding transformer means having each winding thereof respectively connected with one of said power thyristors for electromagnetically coupling said power thyristors with each other.

2. An apparatus as claimed in claim 1, said capacitors being respectively connected between the anodes of said power thyristors and to a side of said windings, said power thyristors having the cathodes thereof respectively connected to the other side of said windings.

3. An apparatus as claimed in claim 1, each of the windings of said two-windng transformer means and each of said capacitors forming a series circuit connected respectively in parallel with one of said power thyristors.

4. An apparatus as claimed in claim 1, with said capacitors connected respectively in parallel with said power thyristors, and said windings respectively connected in series.

* * * * *